(12) United States Patent
Tomizawa et al.

(10) Patent No.: US 11,385,094 B2
(45) Date of Patent: Jul. 12, 2022

(54) FLUID LEVEL DETECTION APPARATUS, FLUID LEVEL DETECTION METHOD, AND COMPUTER-READABLE MEDIUM CONTAINING FLUID LEVEL DETECTION PROGRAM

(71) Applicant: SUBARU CORPORATION, Tokyo (JP)

(72) Inventors: Tsutomu Tomizawa, Tokyo (JP); Iwao Murata, Tokyo (JP); Kohei Takahashi, Tokyo (JP); Keiji Hori, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 236 days.

(21) Appl. No.: 16/752,765

(22) Filed: Jan. 27, 2020

(65) Prior Publication Data
US 2020/0292371 A1 Sep. 17, 2020

(30) Foreign Application Priority Data

Mar. 14, 2019 (JP) .............................. JP2019-046757
Aug. 23, 2019 (JP) .............................. JP2019-152424

(51) Int. Cl.
*G01F 23/296* (2022.01)
*G01K 1/22* (2006.01)

(52) U.S. Cl.
CPC ........... *G01F 23/2961* (2013.01); *G01K 1/22* (2013.01); *G01F 23/296* (2013.01)

(58) Field of Classification Search
CPC .................................................... G01F 23/296
See application file for complete search history.

(56) References Cited

U.S. PATENT DOCUMENTS 4,896,535 A * 1/1990 Duckart ................ G01F 23/296
 181/0.5
5,015,995 A * 5/1991 Holroyd .............. G01F 23/2965
 340/621

(Continued)

FOREIGN PATENT DOCUMENTS

DE          10354473 A1 *  6/2005    ............... G01H 3/00
DE   10 2010 062108 A1     5/2012
JP        2008-14267 A     1/2008

OTHER PUBLICATIONS

Communication pursuant to Article 94(3) EPC issued in European Patent Application No. 20 150 007.1 dated Aug. 17, 2021.

(Continued)

*Primary Examiner* — Lisa M Caputo
*Assistant Examiner* — Alex T Devito
(74) *Attorney, Agent, or Firm* — Troutman Pepper Hamilton Sanders LLP

(57) ABSTRACT

A fluid level detection apparatus includes a vibrator, a vibration sensor, and a controller. The vibrator is configured to apply a vibration to a container that contains a fluid. The vibration sensor is configured to detect a vibration wave that is generated by the vibrator and propagates through the container. The controller is configured to control an operation of the vibrator and perform arithmetic processing on a detection signal obtained from the vibration sensor. The vibrator and the vibration sensor are provided on an outer wall surface of the container at respective positions that interpose, from above and below, a fluid level of the fluid provided in the container. The controller is configured to calculate a height of the fluid level, on the basis of the vibration wave detected by the vibration sensor.

17 Claims, 8 Drawing Sheets

(56) References Cited

U.S. PATENT DOCUMENTS

| | | | | |
|---|---|---|---|---|
| 5,755,136 A | * | 5/1998 | Getman | G01F 23/2961 |
| | | | | 73/290 V |
| 5,793,705 A | * | 8/1998 | Gazis | G10K 11/004 |
| | | | | 367/98 |
| 6,397,656 B1 | * | 6/2002 | Yamaguchi | G01F 23/2968 |
| | | | | 73/1.82 |
| 6,631,639 B1 | | 10/2003 | Dam et al. | |
| 2016/0320226 A1 | | 11/2016 | Schaefer et al. | |
| 2016/0349097 A1 | | 12/2016 | Crouse | |
| 2018/0080809 A1 | | 3/2018 | Tokarev et al. | |

OTHER PUBLICATIONS

Extended European Search Report issued in corresponding European Patent Application No. 20 15 0007 dated Jul. 6, 2020.

* cited by examiner

FLUID LEVEL DETECTION APPARATUS, FLUID LEVEL DETECTION METHOD, AND COMPUTER-READABLE MEDIUM CONTAINING FLUID LEVEL DETECTION PROGRAM

CROSS-REFERENCE TO RELATED APPLICATIONS

The present application claims priority from Japanese Patent Application No. 2019-046757 filed on Mar. 14, 2019 and Japanese Patent Application No. 2019-152424 filed on Aug. 23, 2019, the entire contents of each of which are hereby incorporated by reference.

BACKGROUND

The technology relates to a technique that detects a fluid level of a fluid provided in a container.

A mobile body such as a helicopter indirectly monitors an amount of a lubricant provided in a transmission on the basis of a hydraulic pressure in a lubrication system.

SUMMARY

An aspect of the technology provides a fluid level detection apparatus that includes a vibrator, a vibration sensor, and a controller. The vibrator is configured to apply a vibration to a container that contains a fluid. The vibration sensor is configured to detect a vibration wave that is generated by the vibrator and propagates through the container. The controller is configured to control an operation of the vibrator and perform arithmetic processing on a detection signal obtained from the vibration sensor. The vibrator and the vibration sensor are provided on an outer wall surface of the container at respective positions that interpose, from above and below, a fluid level of the fluid provided in the container. The controller is configured to calculate a height of the fluid level, on the basis of the vibration wave detected by the vibration sensor.

An aspect of the technology provides a fluid level detection method that includes: providing a vibrator and a vibration sensor on an outer wall surface of a container at respective positions that interpose, from above and below, a fluid level of a fluid provided in the container, in which the vibrator is configured to apply a vibration to the container that contains the fluid, and the vibration sensor is configured to detect a vibration wave that is generated by the vibrator and propagates through the container; and calculating, with a controller, a height of the fluid level, on the basis of the vibration wave detected by the vibration sensor.

An aspect of the technology provides a non-transitory computer readable medium containing a fluid level detection program. The fluid level detection program causes, when executed by a computer, the computer to implement a method. The method includes calculating a height of a fluid level of a fluid provided in a container, on the basis of a vibration wave generated by a vibrator and detected by a vibration sensor. The vibrator is configured to apply a vibration to the container that contains the fluid. The vibration sensor is configured to detect the vibration wave that is generated by the vibrator and propagates through the container. The vibrator and the vibration sensor are provided on an outer wall surface of the container at respective positions that interpose, from above and below, the fluid level of the fluid provided in the container.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIGS. 5A and 5B are diagrams each illustrating a fuel tank of an aircraft that serves as a target to be diagnosed by a diagnosis system according to one example embodiment of the technology, in which FIG. 5A illustrates an example of an external appearance of the aircraft, and FIG. 5B illustrates an example of a tank chamber of the fuel tank.

DETAILED DESCRIPTION

Figure 1:
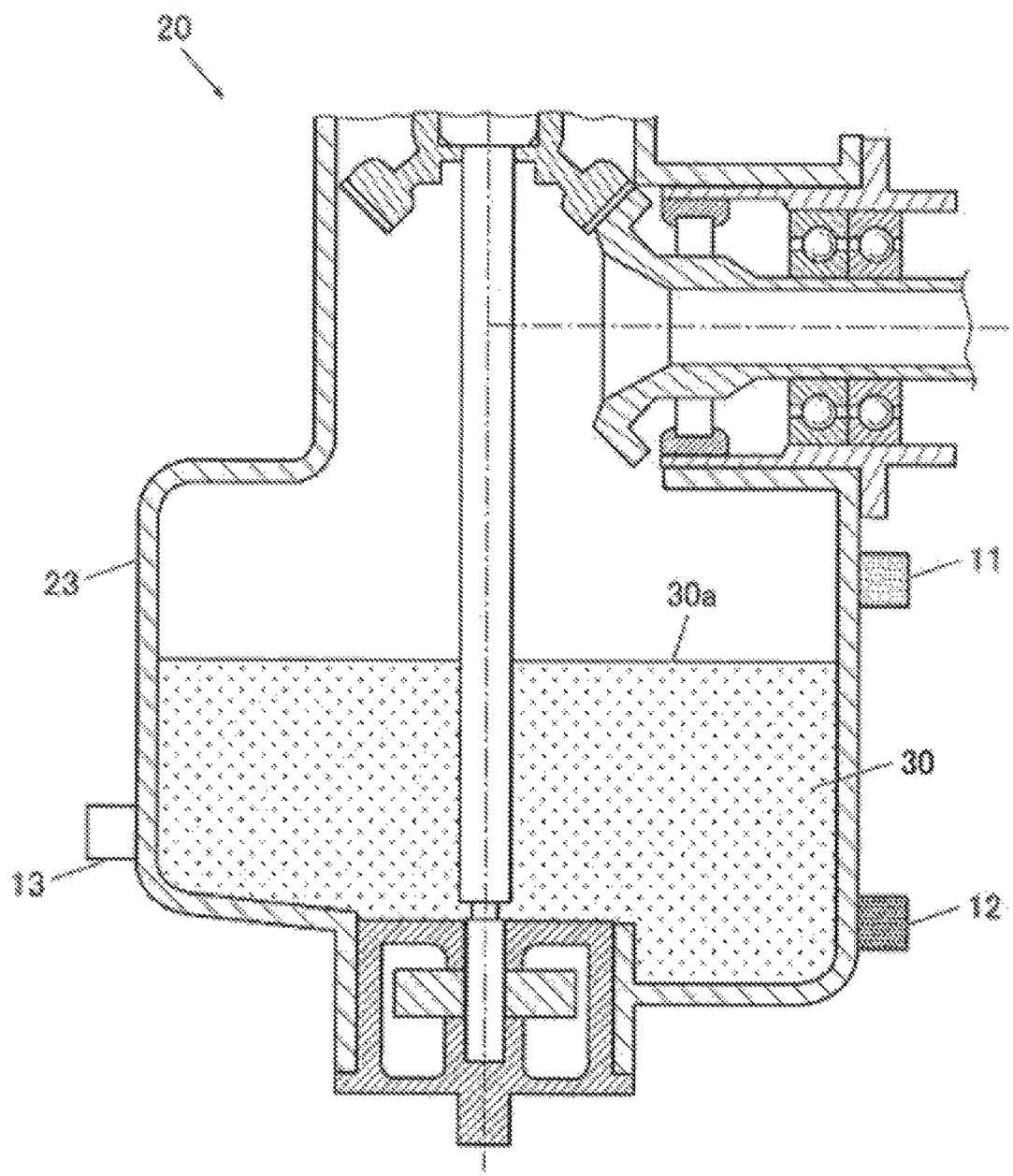
FIG. 1 is a cross-sectional view of a transmission assembly that serves as a target to be diagnosed by a diagnosis system according to one example embodiment of the technology.

In the following, some embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

1. First Example Embodiment

[1-1 Configuration of Diagnosis System]

A description is given first of an example of a configuration of a diagnosis system 10 according to a first example embodiment of the technology.

Figure 2:
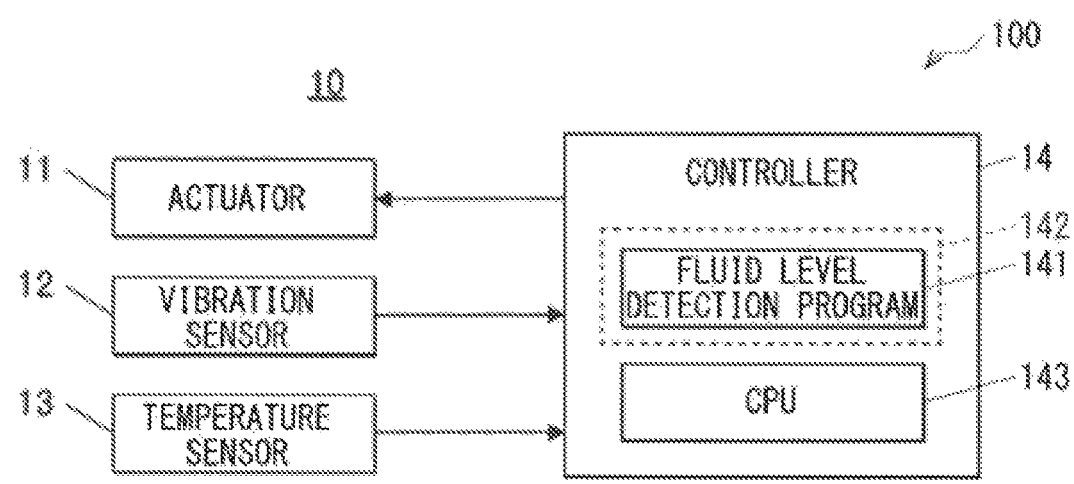
FIG. 2 is a block diagram illustrating an example of a schematic configuration of the diagnosis system according to one example embodiment.

FIG. 1 is a cross-sectional view of a transmission assembly 20 that serves as a target to be diagnosed by the diagnosis system 10. FIG. 2 is a block diagram illustrating an example of a schematic configuration of the diagnosis system 10.

The diagnosis system 10 according to the first example embodiment illustrates an example of a fluid level detection apparatus according to at least one embodiment of the technology. The diagnosis system 10 may be mounted on a mobile body such as a helicopter 100, and may monitor an amount of a lubricant in the transmission assembly 20 of the helicopter 100. In one embodiment, the helicopter 100 may serve as an "aircraft".

The transmission assembly 20 may so converting an output of an engine as to have the appropriate number of rotations and an appropriate angle, and may transmit the converted output of the engine to a rotor. The transmission assembly 20 may include gears that convert the output of the engine in terms of the number of rotations and the angle, and bearings that support the respective gears. The transmission assembly 20 may also include an unillustrated pump for a lubricant 30 that lubricates the gears and the bearings, and an oil sump 23 that contains the lubricant 30, as illustrated in FIG. 1. The oil sump 23 may include a metal or a composite. In one embodiment, the oil sump 23 may serve as a "lubricant sump".

Referring to FIGS. 1 and 2, the diagnosis system 10 includes an actuator 11, a vibration sensor 12, and a controller 14. The diagnosis system 10 may include a temperature sensor 13.

The actuator 11 applies a vibration to the oil sump 23. The actuator 11 may be provided on an upper end of an outer wall surface of the oil sump 23. In one embodiment, the actuator 11 may serve as a "vibrator".

The vibration sensor 12 detects a vibration wave that is generated by the actuator 11 and propagates through the oil sump 23. In some example embodiments, the vibration sensor 12 may be an optical fiber sensor that detects ultrasonic vibration. The vibration sensor 12 may be disposed at a position corresponding to the actuator 11. The vibration sensor 12 is provided on the outer wall surface of the oil sump 23 at a position that interposes a fluid level 30a of the lubricant 30 between the actuator 11 and the vibration sensor 12 from above and below. For example, the vibration sensor 12 may be provided at a lower end, positioned below the actuator 11, of the outer wall surface of the oil sump 23.

The temperature sensor 13 may measure a temperature of a wall of the oil sump 23. The temperature sensor 13 may be provided at a lower part of the outer wall surface of the oil sump 23. The temperature sensor 13 may indirectly acquire a temperature of the lubricant 30 on the basis of the temperature of the wall of the oil sump 23.

The controller 14 may be or may include a computer that has elements including a central processing unit (CPU) 143 and a memory (or a storage) 142. The controller 14 may control each part of the diagnosis system 10 comprehensively. For example, on the basis of a predetermined program and/or an operation performed by a pilot, the controller 14 controls an operation of the actuator 11 and performs arithmetic processing on a detection signal obtained from the vibration sensor 12, the temperature sensor 13, or both. By controlling the operation of the actuator 11 and performing the arithmetic processing, the controller 14 calculates a height of the fluid level 30a in the oil sump 23.

The controller 14 may hold in advance a fluid level detection program 141 in the memory 142. The fluid level detection program 141 may allow for execution of a later-described fluid level detection process. In some example embodiments, the fluid level detection program 141 may be supplied from a computer-readable medium provided outside of the controller 14. In some example embodiments, the fluid level detection program 141 may be supplied via a network.

In one embodiment, the memory 142 may serve as a "non-transitory computer-readable medium".

In one embodiment, the CPU 143 may serve as a "controller".

[1-2 Fluid Level Detection Process by Diagnosis System]

A description is given next of an example of the fluid level detection process. The fluid level detection process may be performed by the diagnosis system 10, and may detect the fluid level 30a in the oil sump 23 to determine excess and deficiency of the lubricant 30.

Figure 3:
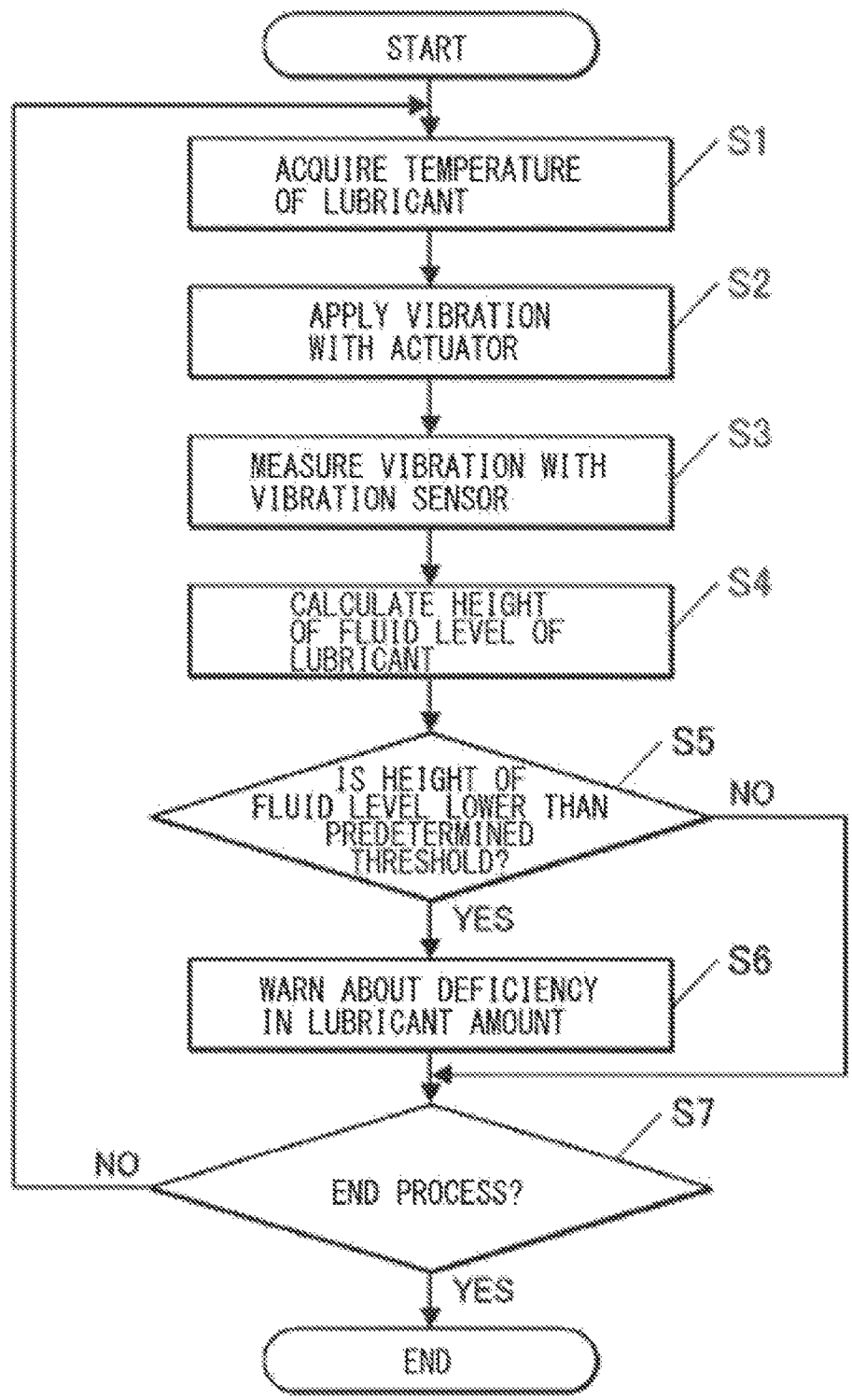
FIG. 3 is a flowchart illustrating an example of a flow of a fluid level detection process according to one example embodiment.
Figure 4A:
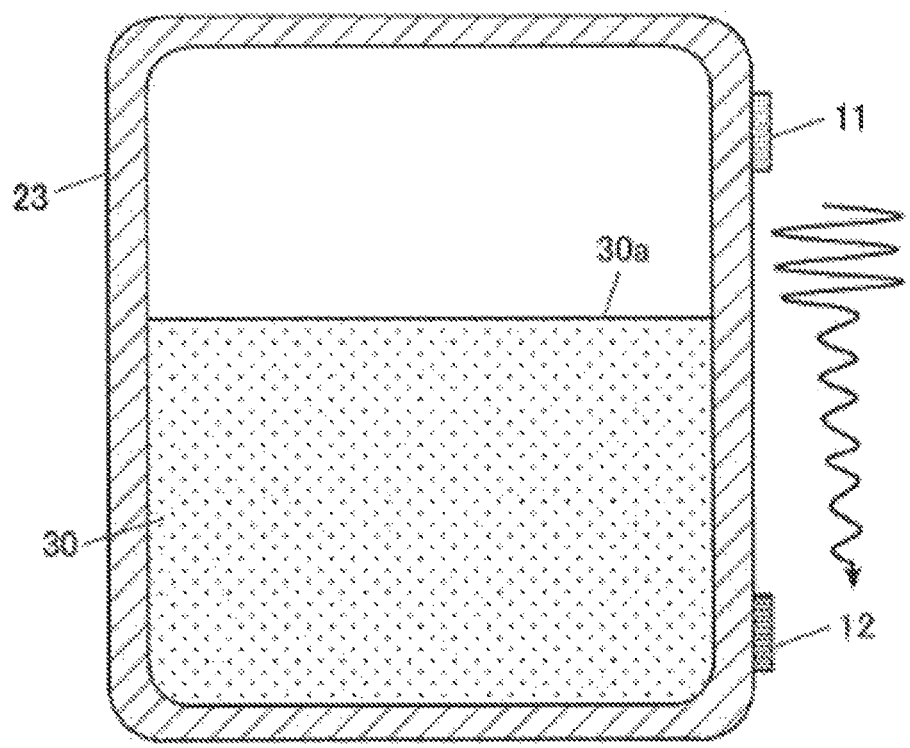
FIGS. 4A and 4B are diagrams each illustrating an example of a principle of detecting a height of a fluid level on the basis of the fluid level detection process according to one example embodiment.
Figure 4B:
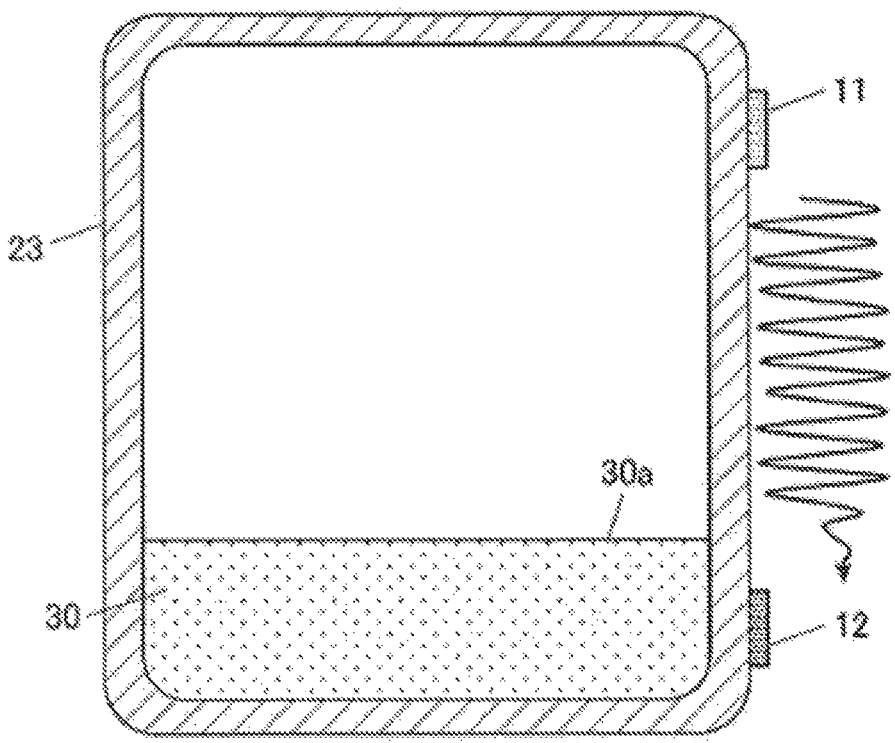

FIG. 3 is a flowchart illustrating an example of a flow of the fluid level detection process. FIGS. 4A and 4B are diagrams each illustrating an example of a principle of detecting the height of the fluid level 30a on the basis of the fluid level detection process.

The fluid level detection process according to the first example embodiment may detect the height of the fluid level 30a of the lubricant 30 in the oil sump 23 and determine whether the lubricant 30 is held at an appropriate amount. The fluid level detection process may be executed through causing the CPU 143 in the controller 14 to read out the fluid level detection program 141 from the memory 142 and expand the fluid level detection program 141. In some example embodiments, the fluid level detection process may be executed through causing the CPU 143 to execute the fluid level detection program 141 read out from the computer-readable medium provided outside of the controller 14, or causing the CPU 143 to execute the fluid level detection program 141 supplied via the network.

Referring to FIG. 3, upon execution of the fluid level detection process, the controller 14 may first acquire the temperature of the lubricant 30 (step S1).

For example, the controller 14 may acquire the temperature of the wall of the oil sump 23 by means of the temperature sensor 13, and may calculate the temperature of the lubricant 30 on the basis of the temperature of the wall of the oil sump 23. For example, the temperature of the lubricant 30 may be calculated on the basis of a previously-acquired relational expression or a previously-acquired table that represents a relationship between the temperature of the wall of the oil sump 23 and the temperature of the lubricant 30. Alternatively, the temperature of the lubricant 30 may be determined on the basis of a heat-transfer calculation.

In some example embodiments, the acquisition of the temperature of the lubricant 30 in step S1 may be performed until the calculation of the height of the fluid level 30a is performed in later-described step S4.

Thereafter, the controller 14 may drive the actuator 11 and thereby applies the vibration to the oil sump 23 (step S2). In some example embodiments, the controller 14 may cause the actuator 11 to generate a broadband ultrasonic vibration (such as Lamb waves) that covers a predetermined frequency range.

Thereafter, the controller 14 detects, with the vibration sensor 12, the vibration wave that is generated by the actuator 11 and propagates through the oil sump 23 (step S3).

Thereafter, the controller 14 calculates the height of the fluid level 30a of the lubricant 30 on the basis of the vibration wave detected in step S3 (step S4). In some example embodiments, the controller 14 may calculate the height of the fluid level 30a of the lubricant 30 on the basis of the temperature of the lubricant 30 acquired in step S1 and the vibration wave detected in step S3.

In one example, in step S4, the controller 14 may first apply a filtering process to the vibration wave detected in step S3 to extract a high frequency component and a low frequency component. The high frequency component may have a first predetermined frequency bandwidth that is higher than a first predetermined frequency. The low frequency component may have a second predetermined frequency bandwidth that is lower than a second predetermined frequency. The predetermined frequencies that serve as thresholds of the respective high frequency component and low frequency component, and/or the predetermined frequency bandwidths that serve as thresholds of the respective high frequency component and low frequency component, may be different from each other between the high frequency component and the low frequency component. Alternatively, the predetermined frequencies that serve as the thresholds of the respective high frequency component and low frequency component, and/or the predetermined frequency bandwidths that serve as the thresholds of the respective high frequency component and low frequency component, may be the same as each other between the high frequency component and the low frequency component.

Thereafter, the controller 14 may calculate a nominal value of the height of the fluid level 30a of the lubricant 30, on the basis of the high frequency component in the detected vibration wave. The vibration waveform that propagates through the oil sump 23 is more attenuated when an amount of lubricant is large, and is less attenuated when the amount of lubricant is small, as illustrated in FIGS. 4A and 4B. Further, in general, the vibration at a high frequency is easily attenuated and is high in directionality as well, making it easier to detect the fluid level 30a. Accordingly, the controller 14 may determine a rough position of the fluid level 30a of the lubricant 30 as the nominal value, on the basis of the high frequency component in the detected vibration wave. Note that a method of calculating the height of the fluid level 30a, or the nominal value of the height of the fluid level 30a, is not particularly limited. For example, data on correlation between a waveform of the vibration wave and the height of the fluid level 30a may be acquired in advance, and the height of the fluid level 30a or the nominal value of the height of the fluid level 30a may be calculated on the basis of the correlation data.

Thereafter, the controller 14 may correct the nominal value of the height of the fluid level 30a, on the basis of the low frequency component in the detected vibration wave. In some example embodiments, the controller 14 may correct the nominal value of the height of the fluid level 30a, on the basis of the temperature of the lubricant 30 acquired in step S1 and the low frequency component in the detected vibration wave. The lubricant 30 causes a change in its viscosity depending on the temperature and thus causes a change in ease of the propagation of the vibration wave. In addition, the vibration at a low frequency is less attenuated but is more susceptible to a temperature as compared with the vibration at the high frequency, making it possible to obtain more accurate data on an influence of the temperature of the lubricant 30 from the low frequency component. Accordingly, the controller 14 may compensate the nominal value of the height of the fluid level 30a by an amount corresponding to the change in the temperature of the lubricant 30, on the basis of the low frequency component in the vibration wave and the temperature of the lubricant 30. Note that a method of correcting the nominal value of the height of the fluid level 30a is not particularly limited. For example, data on correlation between the temperature of the lubricant 30 and the waveform of the vibration wave may be acquired in advance, and the nominal value of the height of the fluid level 30a may be corrected on the basis of the correlation data.

The above example processes make it possible to calculate, more accurately, the height of the fluid level 30a in which the influence of the temperature of the lubricant 30 has been taken into consideration.

Thereafter, the controller 14 may determine whether the height of the fluid level 30a calculated in step S4 is lower than a predetermined threshold (step S5). For example, the threshold may be an upper limit, at which dry run occurs, of a range of the amount of lubricant.

If the controller 14 determines that the height of the fluid level 30a is equal to or higher than the predetermined threshold (step S5: NO), the controller 14 may advance the process to later-described step S7. One reason is that the lubricant 30 satisfies a required amount of lubricant.

If the controller 14 determines that the height of the fluid level 30a is lower than the predetermined threshold (step S5: YES), the controller 14 may warn the pilot of the deficiency in the lubricant 30 (step S6). One reason is that the lubricant 30 does not satisfy the required amount of lubricant.

Thereafter, the controller 14 may determine whether to end the fluid level detection process (step S7). If the controller 14 determines not to end the fluid level detection process (step S7: NO), the controller 14 may advance the process to the above-described step S1. In this case, the controller 14 may repeat the calculation of the height of the fluid level 30a (i.e., the calculation of the amount of lubricant) and the determination on the excess and the deficiency of the lubricant 30 to thereby monitor the amount of the lubricant 30, until the controller 14 determines to end the fluid level detection process.

If the controller 14 determines to end the fluid level detection process (step S7: YES), the controller 14 may end the fluid level detection process. For example, the controller 14 may determine to end the fluid level detection process when a body of the helicopter 100 is stopped.

According to the first example embodiment of the technology, the actuator 11 and the vibration sensor 12 are provided on the outer wall surface of the oil sump 23 at the respective positions that interpose, from above and below, the fluid level 30a of the lubricant 30 provided in the oil sump 23. The height of the fluid level 30a is calculated on the basis of the vibration wave that is generated by the actuator 11 and detected by the vibration sensor 12. The vibration wave may be the ultrasonic vibration.

With this configuration, it is possible to suitably detect the height of the fluid level 30a from the outside of the oil sump 23 that contains the lubricant 30. This configuration in turn allows the actuator 11 and the vibration sensor 12 to be in non-contact with the lubricant 30. Hence, it is possible to improve maintenance of the transmission assembly 20.

In some example embodiments, the height of the fluid level 30a may be corrected on the basis of the temperature of the lubricant 30 actually measured by the temperature sensor 13. Hence, it is possible to calculate, more accurately, the height of the fluid level 30a in which the influence of the temperature of the lubricant 30 has been taken into consideration.

In some example embodiments, the nominal value of the height of the fluid level 30a may be calculated on the basis of the high frequency component in the vibration wave detected by the vibration sensor 12, and the nominal value may be corrected on the basis of the low frequency component in the detected vibration wave. With this configuration, a rough position of the fluid level 30a is detected on the basis of the high frequency component, and the position is corrected on the basis of the low frequency component that is more susceptible to the influence of the temperature.

Hence, it is possible to calculate, even more accurately, the height of the fluid level 30a in which the influence of the temperature of the lubricant 30 has been taken into consideration.

2. Second Example Embodiment

A description is given next of an example of a diagnosis system 40 according to a second example embodiment of the technology. Note that the same or equivalent elements as those of the foregoing first example embodiment are denoted with the same reference numerals, and will not be described in detail.

The diagnosis system 40 according to the second example embodiment differs from the diagnosis system 10 according to the first embodiment, in that the diagnosis system 40 is able to detect a fluctuation in a fluid level.

[2-1 Configuration of Diagnosis System]

A description is given first of an example of a configuration of the diagnosis system 40 according to the second example embodiment of the technology.

Figure 5A:
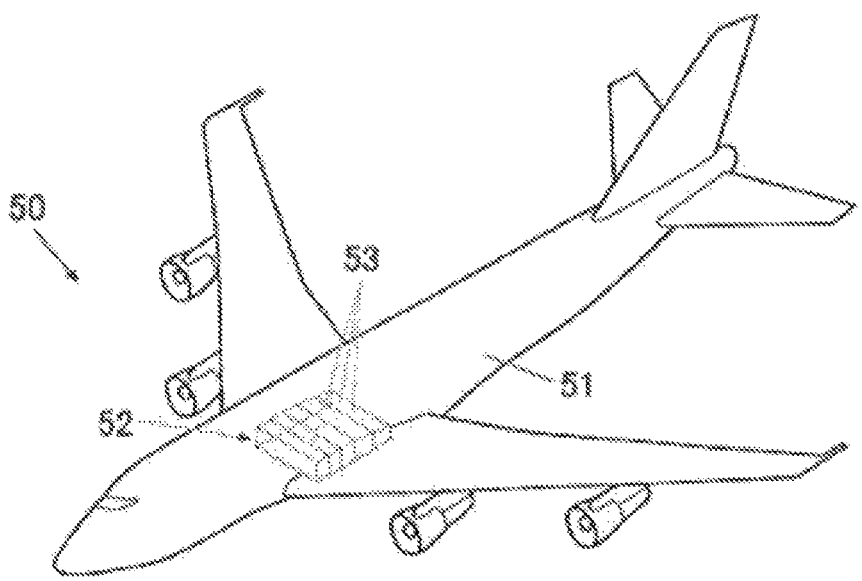
Figure 5B:
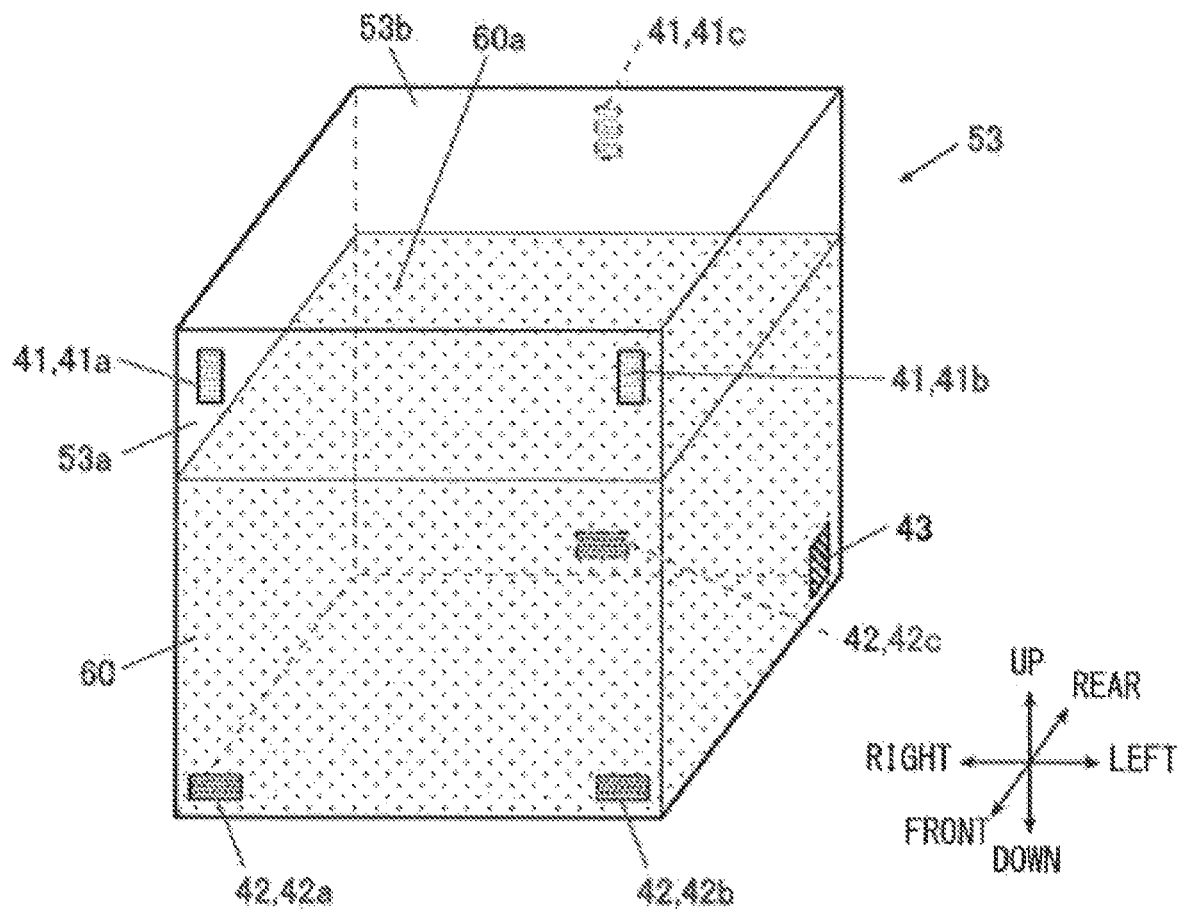
Figure 6:
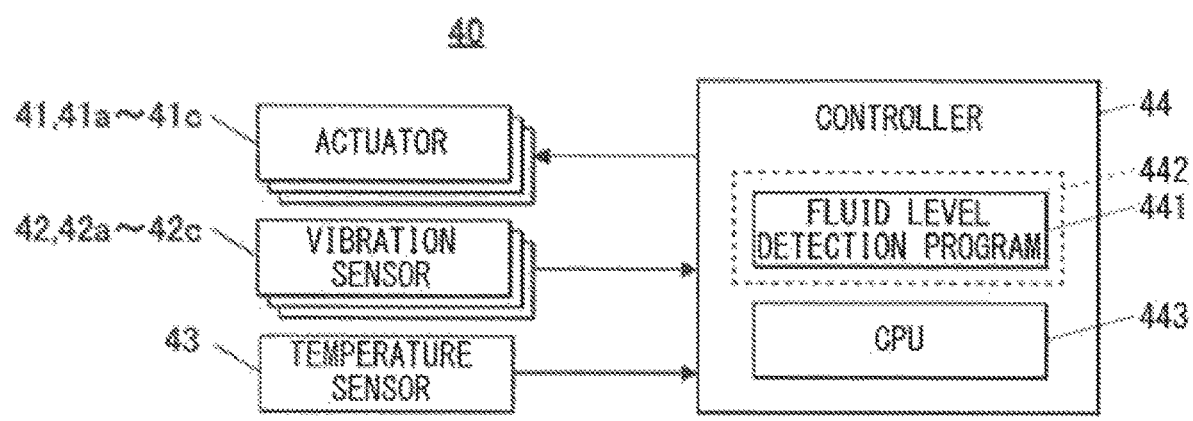
FIG. 6 is a block diagram illustrating an example of a schematic configuration of the diagnosis system according to one example embodiment.

FIGS. 5A and 5B are diagrams each illustrating a fuel tank 52 of an aircraft 50 that serves as a target to be diagnosed by the diagnosis system 40, in which FIG. 5A illustrates an example of an external appearance of the aircraft 50, and FIG. 5B schematically illustrates an example of a tank chamber 53 of the fuel tank 52. FIG. 6 is a block diagram illustrating an example of a schematic configuration of the diagnosis system 40.

The diagnosis system 40 according to the second example embodiment illustrates an example of a fluid level detection apparatus according to at least one embodiment of the technology. The diagnosis system 40 may be mounted on a mobile body such as the aircraft 50, and may monitor an amount of a fuel in the fuel tank 52 of the aircraft 50.

Referring to FIG. 5A, the fuel tank 52 may be disposed in a fuselage 51 of the aircraft 50, and may contain the fuel. The fuel tank 52 may be partitioned into a plurality of tank chambers 53. The tank chambers 53 each may include a partition wall having a hole that allows inside of one tank chamber 53 and inside of adjacent another tank chamber 53 to be in communication with each other. The fuel tank 52 may include a metal or a composite.

Referring to FIGS. 5B and 6, the diagnosis system 40 may include three actuators 41 (i.e., actuators 41a to 41c), three vibration sensors 42 (i.e., vibration sensors 42a to 42c), and a controller 44. The diagnosis system 40 may include a temperature sensor 43.

The three actuators 41, the three vibration sensors 42, and the temperature sensor 43 may be provided on each of the tank chambers 53. In the following, for description purpose, a description is given by referring to only one of the tank chambers 53 provided with the three actuators 41, the three vibration sensors 42, and the temperature sensor 43 that are used for a detection of a fluid level in the relevant tank chamber 53.

The three actuators 41 each may apply a vibration to the fuel tank 52, or to the tank chamber 53. The three actuators 41 may be provided at respective planar positions of the tank chamber 53 that are different from each other, such that the fluctuation of a fluid level 60a of a fuel 60 in the tank chamber 53 is detectable. For example, the three actuators 41 may be provided at respective positions that are different from each other within a horizontal plane, orthogonal to a vertical direction, of the tank chamber 53. The tank chamber 53 here is in an ordinary state in which the tank chamber 53 is not tilted. In an example illustrated in FIG. 5B, the first actuator 41a among the three actuators 41 may be disposed at a right upper end of a front outer wall surface 53a of the tank chamber 53, and the second actuator 41b among the three actuators 41 may be disposed at a left upper end of the front outer wall surface 53a of the tank chamber 53. Further, in the example illustrated in FIG. 5B, the third actuator 41c among the three actuators 41 may be disposed at a middle upper end of a rear outer wall surface 53b of the tank chamber 53.

Note that the positions of the three actuators 41 are not limited to those in the above-described example of the second example embodiment, as long as the positions of the three actuators 41 are different from each other within the horizontal plane of the tank chamber 53 in the ordinary state. Further, the number of actuators 41 is not particularly limited, as long as the diagnosis system 40 includes the three actuators 41 disposed at the respective positions that are different from each other within the horizontal plane of the tank chamber 53.

The three vibration sensors 42 each may detect the vibration wave that propagates through the fuel tank 52, or the tank chamber 53. In some example embodiments, the three vibration sensors 42 each may be the optical fiber sensor that detects the ultrasonic vibration. The three vibration sensors 42 may correspond to the respective three actuators 41, and may be disposed at respective positions below the corresponding three actuators 41. In an example illustrated in FIG. 5B, the first vibration sensor 42a among the three vibration sensors 42 may be disposed at a right lower end of the front outer wall surface 53a of the tank chamber 53, and the second vibration sensor 42b among the three vibration sensors 42 may be disposed at a left lower end of the front outer wall surface 53a of the tank chamber 53. Further, in the example illustrated in FIG. 5B, the third vibration sensor 42c among the three vibration sensors 42 may be disposed at a middle lower end of the rear outer wall surface 53b of the tank chamber 53.

Note that the positions of the three vibration sensors 42 are not limited to those in the above-described example of the second example embodiment, as long as the three vibration sensors 42 are provided at the respective planar positions of the tank chamber 53 that correspond to the three actuators 41 and that are different from each other. The tank chamber 53 here is in the ordinary state. In other words, the positions of the three vibration sensors 42 are not limited to those in the above-described example of the second example embodiment, as long as the positions of the three vibration sensors 42 are different from each other within the horizontal plane of the tank chamber 53 in the ordinary state. Further, the number of vibration sensors 42 is not particularly limited, as long as the diagnosis system 40 includes the three vibration sensors 42 that correspond to the respective three actuators 41.

The temperature sensor 43 may be provided at a lower part of the outer wall surface of the fuel tank 52 (or the tank chamber 53), and may measure a temperature of a wall of the tank chamber 53. The temperature sensor 43 may indirectly acquire a temperature of the fuel 60 on the basis of the temperature of the wall of the tank chamber 53.

The controller 44 may be or may include a computer that has elements including a central processing unit (CPU) 443 and a memory (or a storage) 442. The controller 44 may control each part of the diagnosis system 40 comprehensively. For example, on the basis of a predetermined program and/or an operation performed by the pilot, the controller 44 may control an operation of each of the three actuators 41 and perform arithmetic processing on a detection signal obtained from each of the three vibration sensors 42, the temperature sensor 43, or both. By controlling the operation of each of the actuators 41 and performing the arithmetic processing, the controller 44 may calculate a height of the fluid level 60a in the fuel tank 52.

The controller 44 may hold in advance a fluid level detection program 441 in the memory 442. The fluid level detection program 441 may allow for execution of a later-described fluid level detection process. In some example embodiments, the fluid level detection program 441 may be supplied from the computer-readable medium provided outside of the controller 44. In some example embodiments, the fluid level detection program 441 may be supplied via the network.

In one embodiment, the memory 442 may serve as the "non-transitory computer-readable medium".

In one embodiment, the CPU 443 may serve as the "controller".

[2-2 Fluid Level Detection Process by Diagnosis System]

A description is given next of an example of the fluid level detection process. The fluid level detection process may be performed by the diagnosis system 40, and may detect the fluid level 60a in the fuel tank 52 (i.e., in the tank chamber 53) to determine excess and deficiency of the fuel 60.

Figure 7:
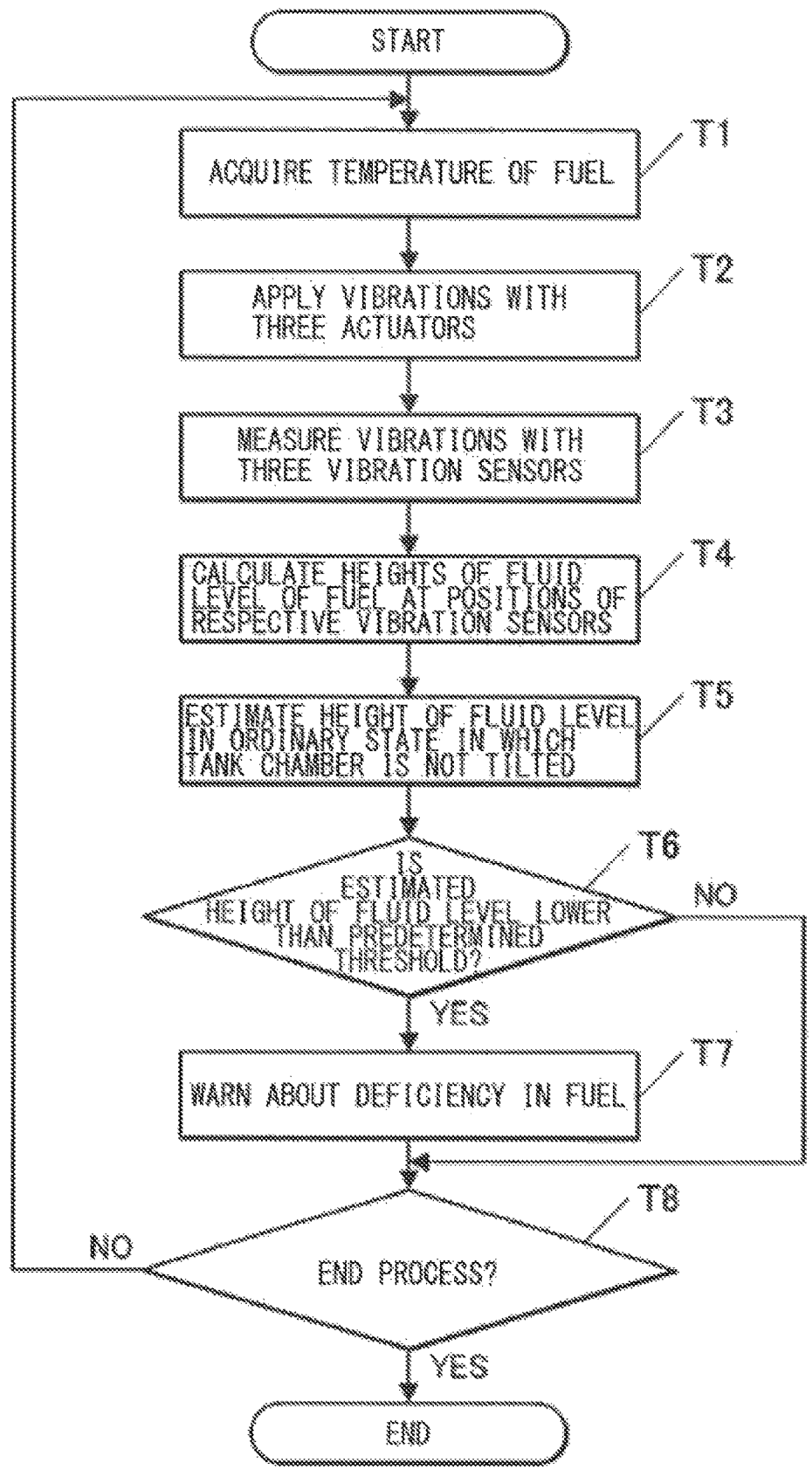
FIG. 7 is a flowchart illustrating an example of a flow of a fluid level detection process according to one example embodiment.
Figure 8:
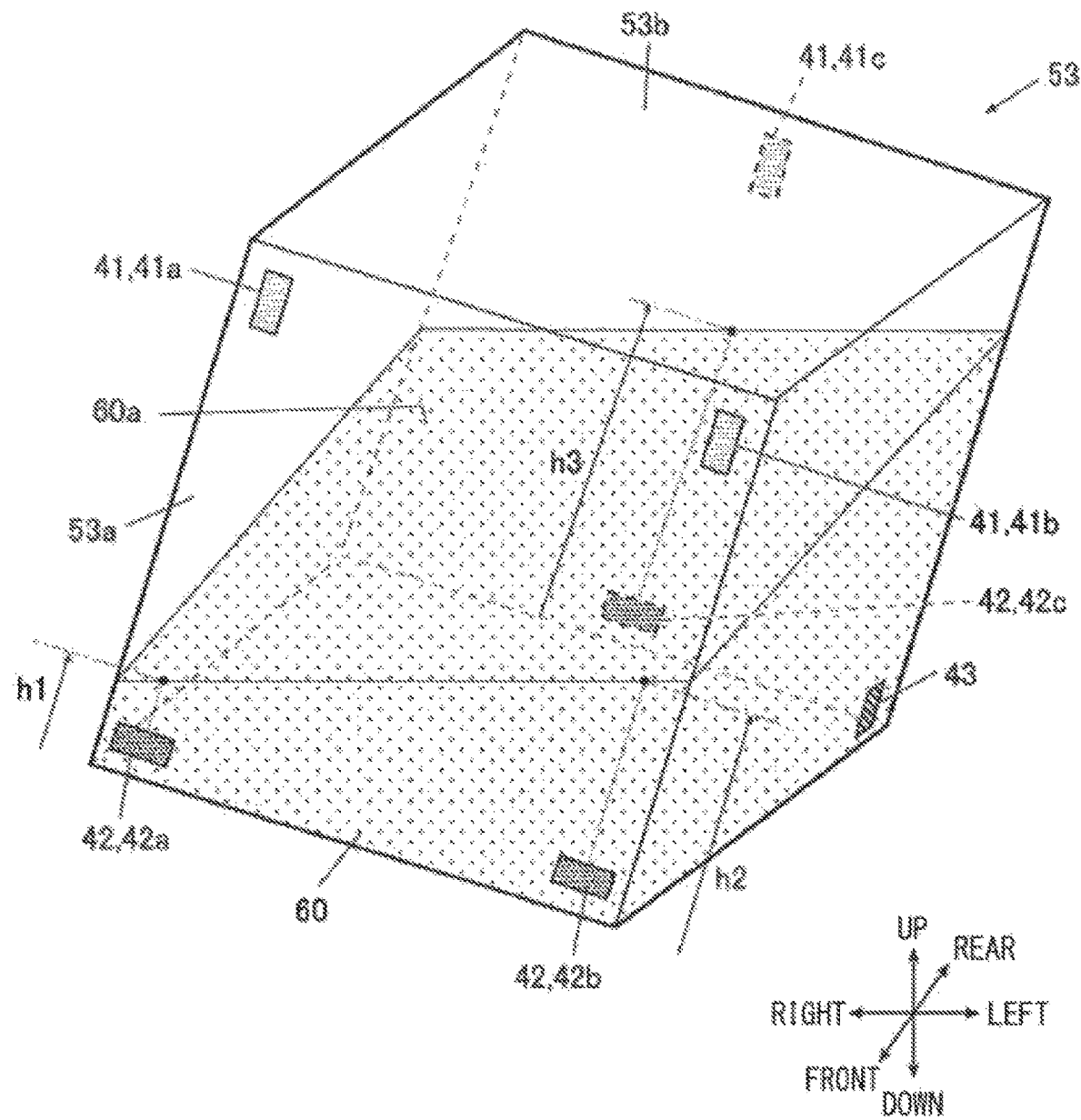
FIG. 8 is a diagram illustrating a state in which a fluid level fluctuates in the tank chamber according to one example embodiment.

FIG. 7 is a flowchart illustrating an example of a flow of the fluid level detection process. FIG. 8 is a diagram illustrating a state in which the fluid level 60a of the fuel 60 in the tank chamber 53 fluctuates.

The fluid level detection process according to the second example embodiment may detect the height of the fluid level 60a of the fuel 60 in the fuel tank 52 (i.e., in the tank chamber 53) and determine whether the fuel 60 is held at an appropriate amount. The fluid level detection process may be executed through causing the CPU 443 in the controller 44 to read out the fluid level detection program 441 from the memory 442 and expand the fluid level detection program 441. In some example embodiments, the fluid level detection process may be executed through causing the CPU 443 to execute the fluid level detection program 441 read out from the computer-readable medium provided outside of the controller 44, or causing the CPU 443 to execute the fluid level detection program 441 supplied via the network.

Referring to FIG. 7, upon execution of the fluid level detection process, the controller 44 may first acquire the temperature of the fuel 60 (step T1).

In one example, the controller 44 may acquire the temperature of the fuel 60 in a manner similar to that of step S1 in the fluid level detection process according to the first example embodiment described above. For example, the controller 44 may acquire the temperature of the wall of the tank chamber 53 by means of the temperature sensor 43, and may calculate the temperature of the fuel 60 on the basis of the temperature of the wall of the tank chamber 53. For example, the temperature of the fuel 60 may be calculated on the basis of a previously-acquired relational expression or a previously-acquired table that represents a relationship between the temperature of the wall of the tank chamber 53 and the temperature of the fuel 60. Alternatively, the temperature of the fuel 60 may be determined on the basis of a heat-transfer calculation.

In some example embodiments, the acquisition of the temperature of the fuel 60 in step T1 may be performed until the calculation of heights of the fluid level 60a is performed in later-described step T4.

Thereafter, the controller 44 may drive the three actuators 41 and thereby apply the vibration to the tank chamber 53 (step T2). In some example embodiments, the controller 44 may cause one or more of the three actuators 41 to generate a broadband ultrasonic vibration (such as the Lamb waves) that covers a predetermined frequency range.

Thereafter, the controller 44 may detect, with the three vibration sensors 42, the vibration waves that are generated by the respective corresponding actuators 41 and propagate through the fuel tank 52 (step T3).

In some example embodiments, the three actuators 41 may generate the vibrations having respective frequencies that are different from each other, to allow the three vibration sensors 42 to distinguish between those vibrations generated by the respective corresponding actuators 41.

Thereafter, the controller 44 may calculate heights of the fluid level 60a of the fuel 60 at the planar positions of the respective three vibration sensors 42, on the basis of the vibrations detected in step T3 (step T4). In some example embodiments, the controller 44 may calculate the heights of the fluid level 60a of the fuel 60 on the basis of the temperature of the fuel 60 acquired in step T1 and the vibration waves detected in step T3.

In step T4, the controller 44 may calculate the heights of the fluid level 60a of the fuel 60 at the planar positions, or at the positions within the horizontal plane, of the respective vibration sensors 42 in the tank chamber 53. For example, the controller 44 may calculate the heights of the fluid level 60a at the planar positions of the respective vibration sensors 42 in a manner similar to that in step S4 performed in the fluid level detection process according to the first example embodiment described above.

In one example, in step T4, the controller 44 may first apply the filtering process to each of the vibration waves detected in step T3 to extract the high frequency component and the low frequency component. The high frequency component may have the first predetermined frequency bandwidth that is higher than the first predetermined frequency. The low frequency component may have the second predetermined frequency bandwidth that is lower than the second predetermined frequency. The predetermined frequencies that serve as thresholds of the respective high frequency component and low frequency component, and/or the predetermined frequency bandwidths that serve as thresholds of the respective high frequency component and low frequency component, may be different from each other between the high frequency component and the low frequency component. Alternatively, the predetermined frequencies that serve as the thresholds of the respective high frequency component and low frequency component, and/or the predetermined frequency bandwidths that serve as the thresholds of the respective high frequency component and low frequency component, may be the same as each other between the high frequency component and the low frequency component.

Thereafter, the controller 44 may calculate the nominal value of each of the heights of the fluid level 60a of the fuel 60, on the basis of the high frequency components in the detected vibration waves. Note that a method of calculating the heights of the fluid level 60a, or the nominal value of each of the heights of the fluid level 60a, is not particularly limited. For example, data on correlation between waveforms of the respective vibration waves and the heights of the fluid level 60a may be acquired in advance, and the heights of the fluid level 60a or the nominal value of each of the heights of the fluid level 60a may be calculated on the basis of the correlation data.

Thereafter, the controller 44 may correct the nominal value of each of the heights of the fluid level 60a of the fuel 60, on the basis of the low frequency components in the detected vibration waves. In some example embodiments, the controller 44 may correct the nominal value of each of the heights of the fluid level 60a, on the basis of the temperature of the fuel 60 acquired in step T1 and the low frequency components in the detected vibration waves. Note that a method of correcting the nominal value of each of the heights of the fluid level 60a is not particularly limited. For example, data on correlation between the temperature of the fuel 60 and the waveforms of the respective vibration waves may be acquired in advance, and the nominal value of each of the heights of the fluid level 60a may be corrected on the basis of the correlation data.

The above example processes thus allow for calculation of heights h1 to h3 of the fluid level 60a at the planar positions of the respective three vibration sensors 42 as illustrated in FIG. 8. By determining a difference between the heights h1 to h3, it is possible to detect a fluctuation of the fluid level 60a caused by, for example, a tilt of the tank chamber 53 or acceleration/deceleration of a body of the aircraft 50.

Thereafter, the controller 44 may estimate the height of the fluid level 60a in the ordinary state of the tank chamber 53, on the basis of the three heights h1 to h3 of the fluid level 60a calculated in step T4 (step T5).

For example, the controller 44 may calculate an estimated height of the fluid level 60a in the ordinary state of the tank chamber 53 in which the tank chamber 53 is not tilted (i.e., the estimated height of the fluid level 60a where no fluctuation occurs in the fluid level 60a), on the basis of the three heights h1 to h3 of the fluid level 60a and a positional relationship between the three vibration sensors 42 corresponding to those heights h1 to h3 of the fluid level 60a.

Thereafter, the controller 44 may determine whether the estimated height of the fluid level 60a calculated in step T5 is lower than a predetermined threshold (step T6).

If the controller 44 determines that the estimated height of the fluid level 60a is equal to or higher than the predetermined threshold (step T6: NO), the controller 44 may advance the process to later-described step T8. One reason is that the fuel 60 satisfies a required amount of fuel.

If the controller 44 determines that the estimated height of the fluid level 60a is lower than the predetermined threshold (step T6: YES), the controller 44 may warn the pilot of the deficiency in the fuel 60 (step T7). One reason is that the fuel 60 does not satisfy the required amount of fuel.

Thereafter, the controller 44 may determine whether to end the fluid level detection process (step T8). If the controller 44 determines not to end the fluid level detection process (step T8: NO), the controller 44 may advance the process to the above-described step T1. In this case, the controller 44 may repeat the calculation of the estimated height of the fluid level 60a (i.e., the calculation of the amount of fuel) and the determination on the excess and the deficiency of the fuel 60 to thereby monitor the amount of the fuel 60, until the controller 44 determines to end the fluid level detection process.

If the controller 44 determines to end the fluid level detection process (step T8: YES), the controller 44 may end the fluid level detection process. For example, the controller 44 may determine to end the fluid level detection process when the body of the aircraft 50 is stopped.

According to the second example embodiment of the technology, it is possible to achieve effects that are similar to those of the first example embodiment described above.

In addition, in the second example embodiment, the three actuators 41 may be provided at the respective planar positions, of the fuel tank 52 (i.e., the tank chamber 53) in the ordinary state, that are different from each other. Further, the three vibration sensors 42 may be provided at the respective planar positions of the fuel tank 52 (i.e., the tank chamber 53) that correspond to the three actuators 41 and that are different from each other.

With this configuration, on the basis of the vibration waves detected by the three vibration sensors 42, the three heights h1 to h3 of the fluid level 60a at the planar positions of those three vibration sensors 42 may be calculated. Further, the height of the fluid level 60a where no fluctuation occurs in the fluid level 60a may be determined on the basis of the thus-calculated heights h1 to h3 of the fluid level 60a.

Hence, it is possible to detect the amount of the fuel 60 more accurately even in a case where the fluid level 30a fluctuates due to bank of the body of the aircraft 50, acceleration or deceleration of the body of the aircraft 50, or any other factor that causes the fluctuation in the fluid level 60a. This in turn makes it possible to detect a remaining amount of the fuel 60 more accurately and to improve safety upon operation accordingly.

In addition, in some example embodiments, the three actuators 41 may generate the respective vibrations having respective frequencies that are different from each other. With this configuration, it is possible to further ensure that the three vibration sensors 42 are able to distinguish between the vibrations generated by the respective corresponding actuators 41.

3. Modification Examples

Although some example embodiments of the technology have been described in the foregoing, the technology is by no means limited to the first and the second example embodiments described above. Various changes and modifications may be made to any embodiment without departing from the scope of the technology.

For example, in the foregoing example embodiments, the temperature of the wall of the oil sump or the tank chamber may be measured to determine the temperature of the lubricant or the fuel, and the height(s) of the fluid level may be corrected on the basis of the temperature of the lubricant or the fuel. However, the temperature to be measured and the temperature to be used for the correction are not limited thereto. In some example embodiments, the temperature to be measured and the temperature to be used for the correction each may be any temperature that has a correlation with the temperature of the lubricant or the fuel.

In the foregoing example embodiments, the nominal value of the height(s) of the fluid level may be corrected on the basis of the low frequency component in the detected vibration wave and the temperature of the lubricant or the fuel. In some example embodiments, the nominal value of the height(s) of the fluid level may be corrected on the basis of only one of the low frequency component in the detected vibration wave, the temperature of the lubricant, and the temperature of the fuel.

In the foregoing example embodiments, the height(s) of the fluid level of the lubricant or the fuel may be detected on the basis of the actuator(s) and the vibration sensor(s). In some example embodiments, the actuator(s) and the vibration sensor(s) may be used to detect a crack and/or a damage of the wall in addition to the height(s) of the fluid level of the lubricant or the fuel. For example, the crack and/or the damage of the wall may be identified on the basis of a manner in which the vibration wave changes. With this configuration, it is possible to determine a correlation between the damage or the like of a container and a change in a fluid level in the container. Hence, it is possible to identify a cause of a decrease in the fluid level promptly, in an example case where the container is damaged and the fluid in the container is leaked.

In the foregoing example embodiments, causing the actuator(s) and the vibration sensor(s) to correspond to each other while interposing the fluid level from the above and the below suffices. Accordingly, in some example embodiments, the planar positions, or the positions within the horizontal plane, of the actuator(s) and the corresponding vibration sensor(s) in the ordinary state do not necessarily have to be the same as each other. Further, in some example embodiments, the actuator(s) and the vibration sensor(s) may not be provided on a one-on-one basis.

The first example embodiment describes an example of the detection of the fluid level 30a of the lubricant 30 provided in the oil sump 23 of the transmission assembly 20 of the helicopter 100. The second example embodiment describes an example of the detection of the fluid level 60a of the fuel 60 provided in the fuel tank 52 (or the tank chamber 53) of the aircraft 50. Embodiments of the technology, however, are not limited to those examples. Any embodiment of the technology is applicable widely to any technique that detects a fluid level of a fluid provided in a container.

The technology encompasses any possible combination of some or all of the various embodiments and the modifications described herein and incorporated herein. For example, a technique according to the second example embodiment may be applied to the first example embodiment to detect the fluid level of a fuel provided in a fuel tank of the helicopter 100. For example, a technique according to the first example embodiment may be applied to the second example embodiment to detect the fluid level of a lubricant provided in a lubricant sump of the aircraft 50.

4. Comparative Example

A mobile body such as a helicopter monitors, in an indirect fashion, an amount of lubricant provided in a transmission on the basis of a hydraulic pressure in a lubrication system. Such an indirect monitoring does not monitor the amount of lubricant in a direct fashion, meaning that it is not possible to immediately detect a leakage of the lubricant if the lubricant is leaked, which in turn can result in dry run.

To address such a concern, one method may be to provide an oil meter or an oil level gauge on an inner side of a case or a container that contains the lubricant, and detect an amount of lubricant or a height of a lubricant level. For example, reference is made to Japanese Unexamined Patent Application Publication No. 2008-014267.

Providing the measuring instrument on the inner side of the container, however, involves many difficulties, including modification of a transmission and time-consuming inspection and replacement.

It is desirable to accurately detect an amount of lubricant (fuel) or a height of a lubricant level (fuel level) from the outside of a container.

At least one embodiment makes it possible to detect a height of a fluid level appropriately from the outside of a container that contains a fluid.

The controllers 14 and 44 respectively illustrated in FIGS. 2 and 6 are each implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the controllers 14 or 44. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the controllers 14 and 44 respectively illustrated in FIGS. 2 and 6.

The invention claimed is:

1. A fluid level detection apparatus comprising:
   a vibrator configured to apply a vibration to a container that contains a fluid;
   a vibration sensor configured to detect a vibration wave that is generated by the vibrator and propagates through the container; and
   a controller configured to control an operation of the vibrator and perform arithmetic processing on a detection signal obtained from the vibration sensor, wherein,
   the vibrator and the vibration sensor being provided on an outer wall surface of the container at respective positions that interpose, from above and below, a fluid level of the fluid provided in the container,
   the controller being configured to calculate a height of the fluid level, on a basis of the vibration wave detected by the vibration sensor,
   the controller is configured to cause the vibrator to generate, as the vibration, an ultrasonic vibration that covers a predetermined frequency range, and
   the controller is configured to calculate, as the height of the fluid level, a nominal value of the height of the fluid level on a basis of a high frequency component in the vibration wave detected by the vibration sensor, and correct the nominal value on a basis of a low frequency component in the vibration wave detected by the vibration sensor, the high frequency component being higher than a first predetermined frequency, the low frequency component being lower than a second predetermined frequency.

2. The fluid level detection apparatus according to claim 1, further comprising a temperature sensor configured to measure a temperature of the fluid provided in the container, wherein
   the controller is configured to correct the height of the calculated fluid level on a basis of the temperature measured by the temperature sensor.

3. The fluid level detection apparatus according to claim 2, wherein
   the controller is configured to cause the vibrator to generate, as the vibration, an ultrasonic vibration that covers a predetermined frequency range, and
   the controller is configured to calculate, as the height of the fluid level, a nominal value of the height of the fluid level on a basis of a high frequency component in the vibration wave detected by the vibration sensor, and correct the nominal value on a basis of a low frequency component in the vibration wave detected by the vibration sensor, the high frequency component being higher than a first predetermined frequency, the low frequency component being lower than a second predetermined frequency.

4. The fluid level detection apparatus according to claim 3, wherein
the vibrator comprises at least three vibrators provided at respective positions that are different from each other within a horizontal plane of the container that is in an ordinary state, the ordinary state being a state in which the container is not tilted, and
the vibration sensor comprises at least three vibration sensors provided at respective positions that correspond to the at least three vibrators and that are different from each other within the horizontal plane of the container that is in the ordinary state.

5. The fluid level detection apparatus according to claim 4, wherein the controller is configured to cause the at least three vibrators to apply, to the container, the vibrations at frequencies that are different from each other.

6. The fluid level detection apparatus according to claim 2, wherein
the vibrator comprises at least three vibrators provided at respective positions that are different from each other within a horizontal plane of the container that is in an ordinary state, the ordinary state being a state in which the container is not tilted, and
the vibration sensor comprises at least three vibration sensors provided at respective positions that correspond to the at least three vibrators and that are different from each other within the horizontal plane of the container that is in the ordinary state.

7. The fluid level detection apparatus according to claim 6, wherein the controller is configured to cause the at least three vibrators to apply, to the container, the vibrations at frequencies that are different from each other.

8. The fluid level detection apparatus according to claim 1, wherein
the vibrator comprises at least three vibrators provided at respective positions that are different from each other within a horizontal plane of the container that is in an ordinary state, the ordinary state being a state in which the container is not tilted, and
the vibration sensor comprises at least three vibration sensors provided at respective positions that correspond to the at least three vibrators and that are different from each other within the horizontal plane of the container that is in the ordinary state.

9. The fluid level detection apparatus according to claim 8, wherein the controller is configured to cause the at least three vibrators to apply, to the container, the vibrations at frequencies that are different from each other.

10. The fluid level detection apparatus according to claim 2, wherein the fluid level detection apparatus is mounted on an aircraft and configured to detect the fluid level of a lubricant serving as the fluid and provided in a lubricant sump of the aircraft, or detect the fluid level of a fuel serving as the fluid and provided in a fuel tank of the aircraft.

11. The fluid level detection apparatus according to claim 3, wherein the fluid level detection apparatus is mounted on an aircraft and configured to detect the fluid level of a lubricant serving as the fluid and provided in a lubricant sump of the aircraft, or detect the fluid level of a fuel serving as the fluid and provided in a fuel tank of the aircraft.

12. The fluid level detection apparatus according to claim 1, wherein
the vibrator comprises at least three vibrators provided at respective positions that are different from each other within a horizontal plane of the container that is in an ordinary state, the ordinary state being a state in which the container is not tilted, and
the vibration sensor comprises at least three vibration sensors provided at respective positions that correspond to the at least three vibrators and that are different from each other within the horizontal plane of the container that is in the ordinary state.

13. The fluid level detection apparatus according to claim 12, wherein the controller is configured to cause the at least three vibrators to apply, to the container, the vibrations at frequencies that are different from each other.

14. The fluid level detection apparatus according to claim 1, wherein the fluid level detection apparatus is mounted on an aircraft and configured to detect the fluid level of a lubricant serving as the fluid and provided in a lubricant sump of the aircraft, or detect the fluid level of a fuel serving as the fluid and provided in a fuel tank of the aircraft.

15. The fluid level detection apparatus according to claim 1, wherein the fluid level detection apparatus is mounted on an aircraft and configured to detect the fluid level of a lubricant serving as the fluid and provided in a lubricant sump of the aircraft, or detect the fluid level of a fuel serving as the fluid and provided in a fuel tank of the aircraft.

16. A fluid level detection method comprising:
providing a vibrator and a vibration sensor on an outer wall surface of a container at respective positions that interpose, from above and below, a fluid level of a fluid provided in the container, the vibrator being configured to apply a vibration to the container that contains the fluid, the vibration sensor being configured to detect a vibration wave that is generated by the vibrator and propagates through the container;
calculating, with a controller, a height of the fluid level, on a basis of the vibration wave detected by the vibration sensor;
causing, with the controller, the vibrator to generate, as the vibration, an ultrasonic vibration that covers a predetermined frequency range, and
calculate, with the controller, as the height of the fluid level, a nominal value of the height of the fluid level on a basis of a high frequency component in the vibration wave detected by the vibration sensor, and correct the nominal value on a basis of a low frequency component in the vibration wave detected by the vibration sensor, the high frequency component being higher than a first predetermined frequency, the low frequency component being lower than a second predetermined frequency.

17. A non-transitory computer readable medium containing a fluid level detection program, the fluid level detection program causing, when executed by a computer, the computer to implement a method, the method comprising:
providing a vibrator and a vibration sensor on an outer wall surface of a container at respective positions that interpose, from above and below, a fluid level of a fluid provided in the container, the vibrator being configured to apply a vibration to the container that contains the fluid, the vibration sensor being configured to detect a vibration wave that is generated by the vibrator and propagates through the container;
calculating a height of the fluid level, on a basis of the vibration wave detected by the vibration sensor;

causing the vibrator to generate, as the vibration, an ultrasonic vibration that covers a predetermined frequency range, and calculate as the height of the fluid level, a nominal value of the height of the fluid level on a basis of a high frequency component in the vibration wave detected by the vibration sensor, and correct the nominal value on a basis of a low frequency component in the vibration wave detected by the vibration sensor, the high frequency component being higher than a first predetermined frequency, the low frequency component being lower than a second predetermined frequency.

* * * * *